(12) United States Patent
Hagiike

(10) Patent No.: US 6,663,184 B2
(45) Date of Patent: Dec. 16, 2003

(54) FOOTREST UNIT FOR PASSENGER SEAT

(75) Inventor: Junji Hagiike, Omori-nishi (JP)

(73) Assignee: Minebea Co., Ltd., Nagano-Ken (JP)

( * ) Notice: Subject to any disclaimer, the term of this patent is extended or adjusted under 35 U.S.C. 154(b) by 0 days.

(21) Appl. No.: 10/073,145

(22) Filed: Feb. 13, 2002

(65) Prior Publication Data

US 2002/0109390 A1 Aug. 15, 2002

(30) Foreign Application Priority Data

Feb. 15, 2001 (JP) ........................................ 2001-038638

(51) Int. Cl.[7] .................................................. A47C 7/50
(52) U.S. Cl. ............................ 297/423.3; 297/423.36; 297/217.3; 297/423.32
(58) Field of Search ........................ 297/423.36, 423.3, 297/423.27, 217.3, 423.32; 49/28, 26, 27

(56) References Cited

U.S. PATENT DOCUMENTS

| | | | |
|---|---|---|---|
| 4,669,780 A | * | 6/1987 | Sakakibara et al. .......... 297/257 |
| 5,596,840 A | * | 1/1997 | Teich .............................. 49/26 |
| 5,625,980 A | * | 5/1997 | Teich et al. ...................... 49/26 |
| 5,651,587 A | | 7/1997 | Kodaverdian |
| 5,755,493 A | | 5/1998 | Kodaverdian |
| 5,887,949 A | | 3/1999 | Kodaverdian |
| 6,095,610 A | * | 8/2000 | Okajima et al. ........ 297/423.36 |
| 6,267,445 B1 | * | 7/2001 | Marais .................. 297/423.36 |
| 2002/0046494 A1 | * | 4/2002 | Miller et al. .................... 49/26 |

* cited by examiner

*Primary Examiner*—Peter M. Cuomo
*Assistant Examiner*—Stephen D'Adamo
(74) *Attorney, Agent, or Firm*—Oliff & Berridge, PLC

(57) ABSTRACT

A leg rest and a seat back are rotatably mounted at the front and rear of a seat cushion of a passenger seat respectively, and a footrest is mounted on the leg rest in such a manner that it can be extended and retracted. Adjustment of the angle of the seat back and the leg rest and positioning of the footrest are performed using a seat back actuator, a leg rest actuator, and a footrest actuator. A proximity sensor is provided at the end of the footrest, wherein, when the proximity sensor detects that the footrest is approaching an obstacle, downward rotation of the leg rest is stopped and the footrest is moved backward. When the leg rest or the footrest is moved, the interference of the obstacle such as a baggage with the footrest can reliably be prevented.

11 Claims, 4 Drawing Sheets

FOOTREST UNIT FOR PASSENGER SEAT

BACKGROUND OF THE INVENTION

1. Field of the Invention

The present invention relates to a footrest unit for a passenger seat in such as aircrafts, vessels and vehicles.

2. Description of the Related Art

An embodiment of a passenger seat having a conventional footrest unit, which is installed in a cabin of an aircraft, will be described with reference to FIGS. 6 and 7. In a seat 1, as shown in FIG. 6, a seat back 3 is rotatable mounted at a rear end of a seat cushion 2, a leg rest 4 is rotatably mounted at a front end thereof, and a footrest 5 is mounted on the leg rest 4 in such a manner that it can be extended and retracted.

The seat back 3, the leg rest 4, and the footrest 5 are adjusted by actuators (not shown) such as electric motors, and a passenger who is seated at the seat 1 operates a switch (not shown) by hand; thus, the angle of the seat back 3 can freely be adjusted between an upright position (refer to the solid lines in FIG. 6) at which the seat back 3 is almost perpendicular to the seat cushion 2 and an almost horizontal position (refer to the chain double-dashed lines A in FIG. 6), and the angle of the leg rest 4 can freely be adjusted between a housed position (refer to the chain double-dashed line B in FIG. 6) at which it is directed vertically downward and an almost horizontal position (refer to the chain double-dashed line C in FIG. 6). Also, the footrest 5 can freely be positioned between a retracted position (refer to the chain double-dashed line B in FIG. 6), at which the footrest 5 is housed in the leg rest 4, and an extended position (refer to the chain double-dashed line C in FIG. 6) at which it is fully extended.

Accordingly, the seat back 3 and the leg rest 4 can be moved to the horizontal position and the footrest 5 can be extended to the extended position; thus, the seat 1 can be used as a bed (refer to the chain double-dashed lines A and C in FIG. 6).

However, in the seat 1 shown in FIG. 6, when the leg rest 4 is moved to the housed position from a state in which the footrest 5 is at the extended position, or when the footrest 5 is extended from a state in which the leg rest 4 is at the housed position, it is necessary that the end of the foot rest 5 does not interfere with the floor 6.

Accordingly, in the conventional art, when the footrest 5 is moved in relation with an angular position (or the operation time) of the leg rest 4 to move the leg rest 4 from the horizontal position to the housed position, the footrest 5 is automatically moved backward when the leg rest 4 is rotated downward to a specified angle, and when the footrest 5 is extended from the leg rest 4 when it is at the housed position, the footrest 5 is extended after the leg rest 4 is rotated upward to a specified position.

However, the conventional footrest unit of the seat 1 has the following problems: As shown in FIG. 7, for example, when an obstacle 7 such as a baggage of a passenger is placed on the floor 6 below the footrest 5 which is at the extended position, when the leg rest 4 is rotated to the housed position, the end of the footrest 5 comes into contact with the obstacle 7 before the leg rest 4 reaches the specified angular position at which the footrest 5 is to be moved backward. There is, therefore, the risk that the obstacle or the seat 1 may be damaged as a result of the excess load applied thereto.

SUMMARY OF THE INVENTION

The present invention is made in the light of the above problems. Accordingly, it is an object of the present invention to provide a footrest unit for a passenger seat in which the interference of the movement of a footrest by an obstacle can be avoided during the operation of a leg rest or the footrest.

In order to achieve the above object, according to the present invention, a footrest unit of a passenger seat comprises: a leg rest which is rotatably mounted at a front end of a seat cushion; a footrest which is mounted on the leg rest in such a manner that it can be extended and retracted; actuators which can adjust the angle of the leg rest and the position of the footrest; and a non-contact proximity sensor provided at the end of the footrest, wherein the footrest is moved backward when the proximity sensor detects that the footrest is approaching an obstacle during the operation of the leg rest or the footrest.

In such an arrangement, when the proximity sensor detects the presence of an obstacle during the operation of the leg rest or the footrest, the leg rest is moved backward to avoid contact with the obstacle.

In the footrest unit of a passenger seat according to the present invention, preferably, when the proximity sensor detects that the footrest is approaching an obstacle, the downward rotation of the leg rest is stopped.

In such an arrangement, when the proximity sensor detects the presence of an obstacle, the downward rotation of the leg rest is stopped so that the footrest does not approach the obstacle.

In the footrest unit of a passenger seat according to the present invention, preferably, the leg rest can be rotated between an almost horizontal position and a housed position directed almost vertically downward.

In such a construction, the leg rest and the footrest can be arbitrarily positioned between the horizontal position and the housed position.

In the footrest unit of a passenger seat according to the present invention, preferably, the proximity sensor is either an optical proximity sensor or a sonic proximity sensor.

In such an arrangement, approach to the obstacle can be detected based on the change in the output voltage or the like from the optical proximity sensor or the sonic proximity sensor.

DESCRIPTION OF THE PREFERRED EMBODIMENTS

An embodiment of the present invention will be described herein below with reference to the drawings.

Figure 1:
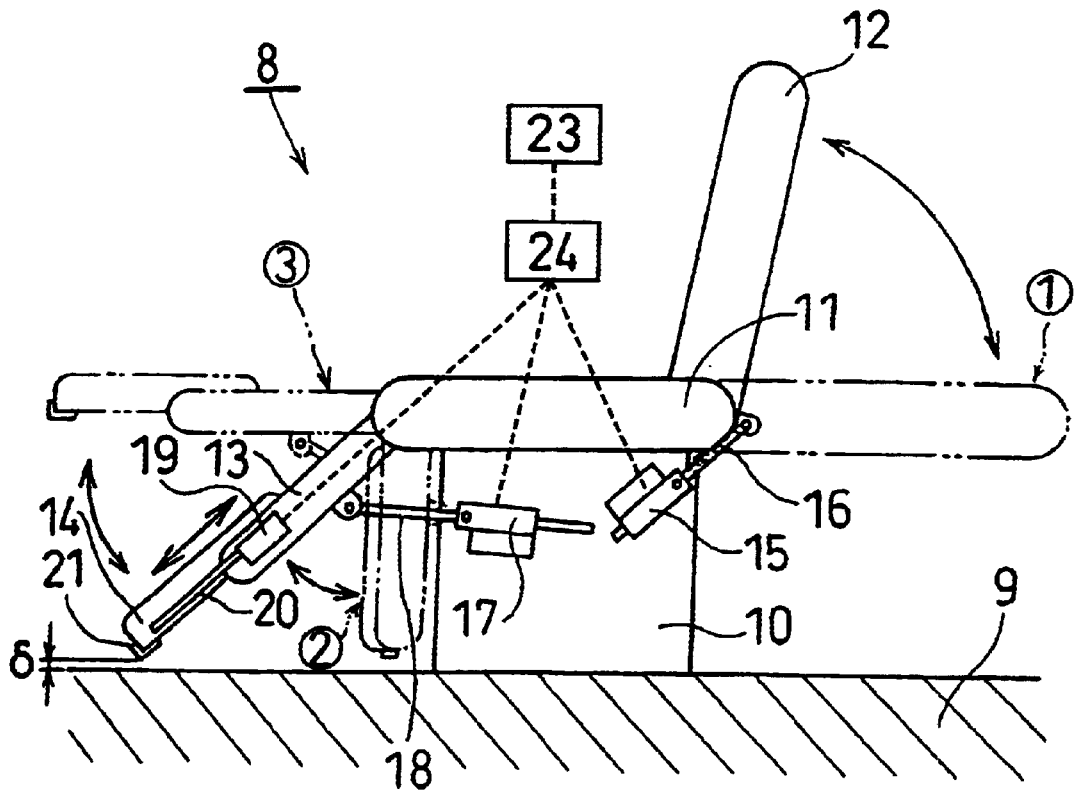
FIG. 1 is a side view showing a schematic structure of a passenger seat having a footrest unit according to an embodiment of the present invention, FIG. 2 view showing a state in which a footrest is at an extended position an a leg rest is at a horizontal position in the footrest unit shown in FIG. 1.

As shown in FIG. 1, a passenger seat 8 according the embodiment is a reclining seat which is placed in a passenger cabin of an aircraft, wherein a base 10 fixed on a floor 9 of a body of the aircraft has a seat cushion 11, a seat back 12 provided at a rear end of the seat cushion 11, and a leg rest 13 arranged at a front end thereof, wherein the seat back 12 and the leg rest 13 are rotatably supported with respect to the seat cushion 11. In addition, the leg rest 13 has a footrest 14 mounted thereon in such a manner that it can be extended and retracted.

An operating rod 16 of a seat back actuator 15 which is mounted on the base 10 is connected to the seat back 12. By the expansion and contraction of the operating rod 16, the seat back 12 can be rotated between an uprising position (refer to the solid line in FIG. 1) at which it is inclined slightly backward from an upright position and an almost horizontal position (refer to the chain double-dashed line A in FIG. 1).

An operating rod 18 of a leg rest actuator 17 (actuator) which is mounted on the base 10 is connected to the leg rest 13. By the expansion and contraction of the operating rod 18, the leg rest 13 can be rotated between a housed position (refer to the chain double-dashed line B in FIG. 1) at which it is directed vertically downward and an almost horizontal position (refer to the chain double-dashed line C in FIG. 1).

An operating rod 20 of a footrest actuator 19 (actuator) which is mounted on the leg rest 13 is connected to the footrest 14, wherein, by the expansion and contraction of the operating rod 20, the footrest 14 can be ended and retracted between a retracted position (refer to the chain double-dashed line B in FIG. 1), at which the foot rest 14 is housed in the leg rest 13, and an extended position (refer to the chain double-dashed line C in FIG. 1), at which the foot rest 14 is fully extended.

The seat back actuator 15, the leg rest actuator 17, and the footrest actuator 19 are adjusted by a device such as an electric motor, and the operation and the suspension can be controlled by a switch 23 via a controller 24, located at near the hand of the passenger who is seated at the seat 8, thus the seat back, the leg rest, and the footrest can be fixed at arbitrary positions.

A proximity sensor 21 is mounted at a lower corner at the end of the footrest 14. The proximity sensor 21 is a non-contact sensor which operates as an object comes close to the detecting range thereof. For example, an optical proximity sensor such as an infrared proximity sensor, or a sonic proximity sensor such as an ultrasonic proximity sensor can be used. In addition, the proximity sensor 21 may be a proximity switch which is activated and which outputs an ON/OFF signal when the footrest approaches the object at a position within a specified distance of the detecting section. The detecting section of the proximity sensor 21 is directed to an area from the front part of the end of the footrest 14 to a slightly lower part, and is disposed in such a position that it detects an object located in front of the footrest in the path thereof when the leg rest 13 is rotated downward from a horizontal position and when the footrest is extended.

The proximity sensor 21 is connected to the above-mentioned controller, and outputs an actuating signal such as a voltage or the like when it detects that the object is within a predetermined operating distance δ. The controller receives the actuating signal from the proximity sensor 21, and commands the footrest actuator 19 to move the footrest 14 backward. Furthermore, the controller controls the leg rest actuator 17 to stop the downward rotation of the leg rest 13. In addition, the proximity sensor 21 is set so that when the leg rest 13 is at the housed position and also the footrest 14 is at the retracted position (refer to the chain double-dashed line B in FIG. 1), it does not detect the surface of the floor 9.

The operation of the present embodiment as constructed above will be described herein below.

The passenger who is seated at the seat 8 actuates the seat back actuator 15, the leg rest actuator 17, and the footrest actuator 19 by the switch near hand; therefore, the passenger can freely adjust the angular position of the seat back 12 and the leg rest 13 and the extended position of the footrest 14. Furthermore, by moving the seat back 12 and the leg rest 13 to the horizontal position and extending the footrest 14 to the extended position, the passenger can use the seat 8 as a bed (refer to the chain double-dashed lines A and C).

Figure 2:
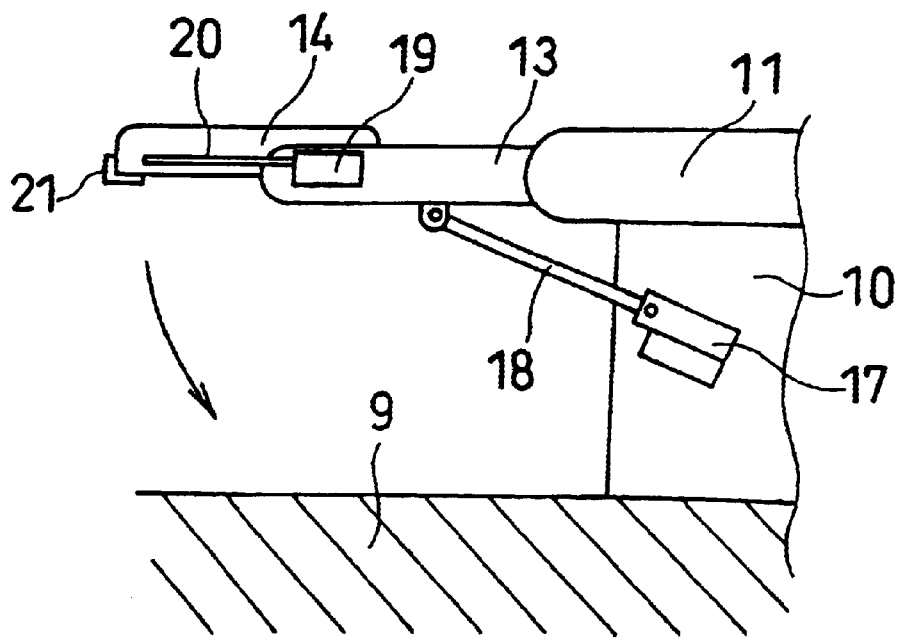
Figure 3:
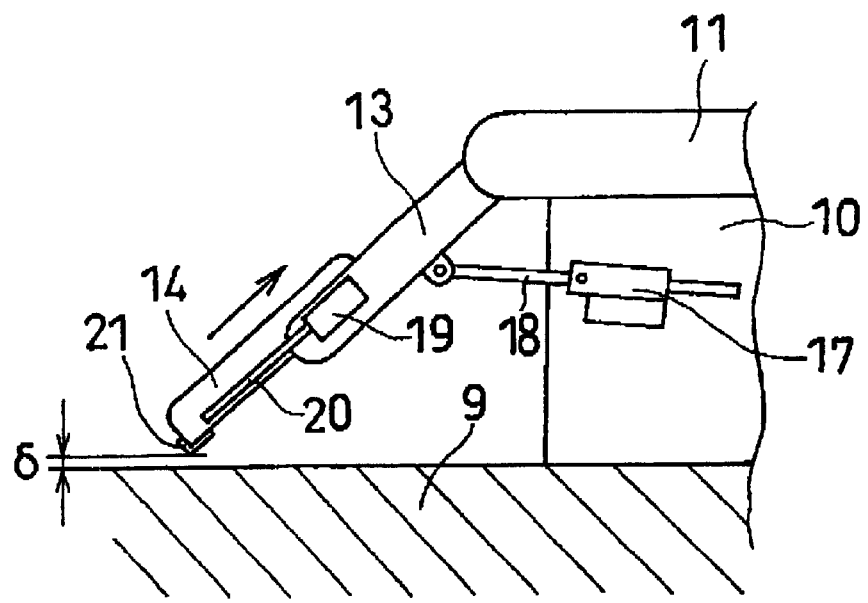
FIG. 3 is a view showing a state in which an end of the footrest comes close to a floor by downward rotation of the leg rest in the footrest unit shown in FIG. 1.
Figure 4:
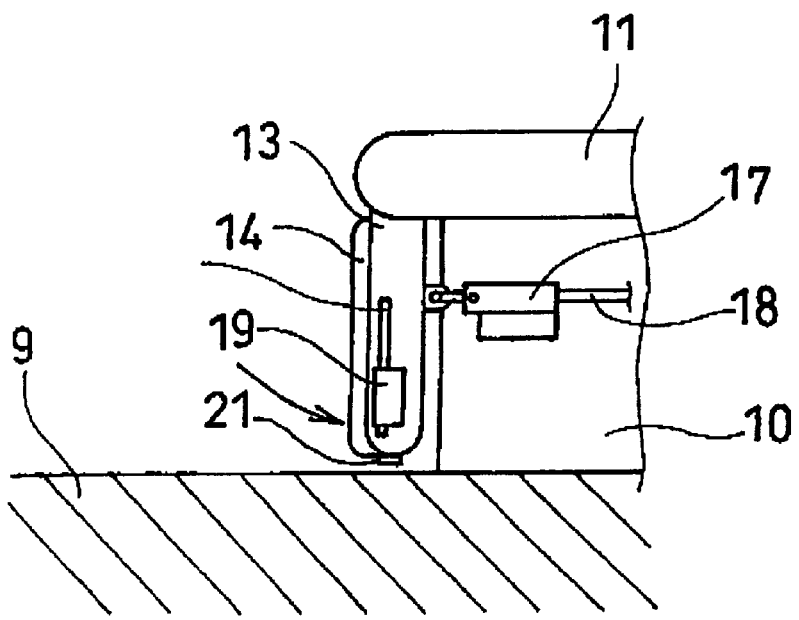
FIG. 4 is a view showing a state in which the footrest is at a retracted position and the leg rest is at a housed position in the footrest unit shown in FIG. 1.

In the case where the leg rest 13, which is at the horizontal position in a state in which the footrest 14 is extended as shown in FIG. 2, is rotated downward to be moved to the housed position shown in FIG. 4, when the end of the footrest 14 comes within an operating distance δ of the floor 9 (obstacle) as shown in FIG. 3, the proximity sensor 21 outputs the actuating signal. Receiving the actuating signal, the controller stops the leg rest actuator 17 in order to stop the downward rotation of the leg rest 13, and causes the footrest actuator 19 to move the footrest 14 backward. When the footrest 14 is moved backward and the end thereof is moved away from the floor 9, the actuating signal of the proximity sensor 21 is cancelled so that the operation of the leg. rest actuator 17 can be started again and the leg rest 13 can be rotated further downward. In this way, a specified space can be constantly maintained between the end of the footrest 14 and the floor 9, and the leg rest 13 and the footrest 14 can be moved to the housed position shown in FIG. 4 without the floor 9 interfering with the movement of the footrest 14.

In addition, when the rate of the backward movement of the footrest 14 is sufficiently higher than the rate of rotation of the leg rest 13, the interference of the movement of the footrest 14 by the floor 9 can be avoided without temporarily stopping the downward rotation of the leg rest 13.

Figure 5:
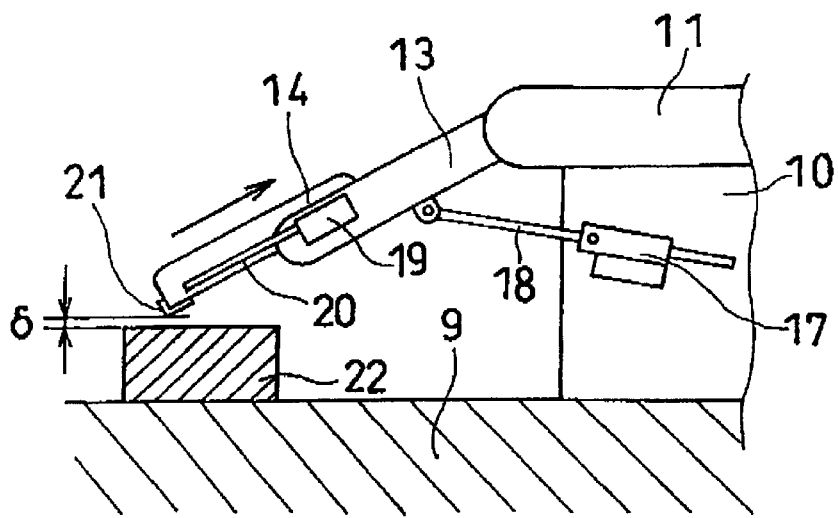
FIG. 5 is a view showing a state in which the end of the footrest comes close to an obstacle by the downward rotation of the leg rest in the footrest unit shown in FIG. 1.
Figure 6:
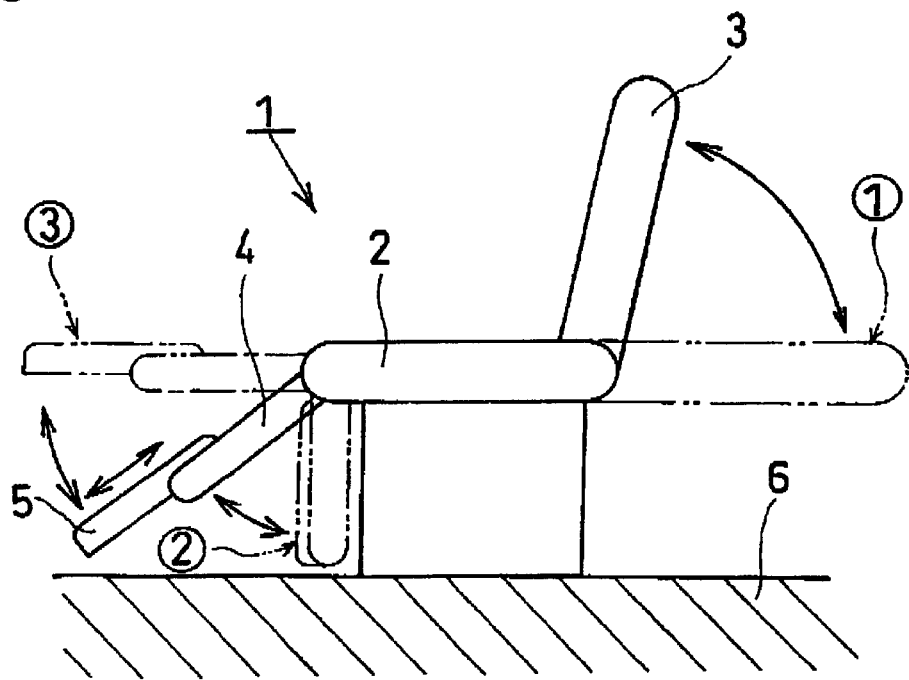
FIG. 6 is a side view showing a schematic structure of an aircraft seat having a conventional footrest unit.
Figure 7:
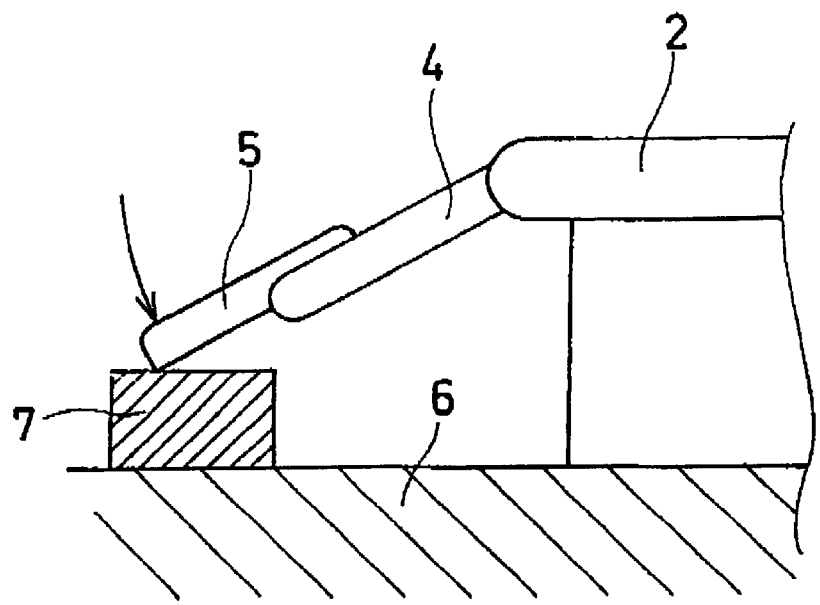
FIG. 7 is a view showing a state in which the end of the footrest comes into contact with the obstacle by the downward rotation of the leg rest in the conventional footrest unit shown in FIG. 6.

In this instance, even in the case where an obstacle 22 such as baggage is placed on the floor 9 below the footrest 14 as shown in FIG. 5, when the end of the footrest 14 comes within the actuating distance δ of the proximity sensor 21 of the obstacle 22 during the downward rotation of the leg rest 13, the proximity sensor 21 outputs an actuating signal, and the downward rotation of the leg rest 13 is temporarily stopped and the footrest 14 is moved backward; thus, the interference of the movement of the footrest 14 by the obstacle 22 can be avoided and the leg rest 13 and the footrest 14 can be moved smoothly to the housed position shown in FIG. 4. In this manner, damage to the baggage resulting from the baggage interfering with the movement of the footrest 14 or damage to the seat 8 resulting from the excess load applied thereto can reliably be prevented.

In the above-described embodiment, a seat in which the seat cushion is fixed is described as an example; however, the present invention is not limited to this, and can be similarly applied to a seat in which the seat back can be slid in cooperation with the rotation of the seat back. Also, in the above-described embodiment, while a case in which the present invention is applied to passenger seats of the aircrafts, the present invention is not limited to this, and can be similarly applied to passenger seats in such as vehicles and vessels.

As specifically described, in the footrest unit for the passenger seat according to the present invention, since when the approach to the obstacle is detected by the proximity sensor, the footrest is moved backward, when the leg rest or the footrest is moved, the interference of the obstacle such as a baggage with the footrest can reliably be avoided; consequently, damage to the baggage resulting from contact with the footrest and damage to the seat due to excessive load applied thereto can surely be prevented.

In the footrest unit of the passenger seat according to the present invention, when the proximity sensor detects an obstacle, the downward rotation of the leg rest is stopped and the approach of the footrest to the obstacle is stopped; thus, the contact of the footrest with the obstacle can reliably be prevented.

In the footrest unit of the passenger seat according to the present invention, the leg rest and the footrest can be arbitrarily positioned between the horizontal position and the housed position.

In the footrest unit of the passenger seat according to the present invention, the proximity sensor is the optical proximity sensor or the sonic proximity sensor, thus the approach to the obstacle, determined by change in the output voltage or the like of the optical sensor or the sonic sensor, can be reliably detected irrespective of the material of the obstacle.

What is claimed is:

1. A footrest unit for a passenger seat, comprising:
   a leg rest which is rotatably mounted at a front end of a seat cushion;
   a footrest which is mounted on the leg rest in such a manner that it can be extended and retracted;
   a plurality of actuators which can adjust the angle of the leg rest and the position of the footrest;
   a non-contact proximity sensor provided at the end of the footrest having a detecting section disposed to detect unexpected obstacles in the path of the end of the footrest when the leg rest or footrest are moved and send an output signal when such unexpected objects are detected within a predetermined proximity of the detecting section; and
   a controller that receives the output signal and commands, the footrest to retract when the proximity sensor detects that the footrest is approaching unexpected obstacles during the operation of the leg rest or the footrest.

2. The footrest unit for a passenger seat according to claim 1, wherein, when the proximity sensor detects that the footrest is approaching the unexpected obstacles, backward rotation of the leg rest is stopped.

3. The footrest unit for a passenger seat according to claim 1, wherein the leg rest can be rotated between an almost horizontal position and a housed position directed almost vertically downward.

4. The footrest unit for a passenger seat according to claim 1, wherein the proximity sensor is one of an optical proximity sensor and a sonic proximity sensor.

5. The footrest unit for a passenger seat according to claim 2, wherein the leg rest can be rotated between an almost horizontal position and a housed position directed almost vertically downward.

6. The footrest unit for a passenger seat according to claim 2, wherein the proximity sensor is one of an optical proximity sensor and a sonic proximity sensor.

7. The footrest unit for a passenger seat according to claim 3, wherein the proximity sensor is one of an optical proximity sensor and a sonic proximity sensor.

8. A footrest unit for a passenger seat, comprising:
   a leg rest which is rotatably mounted at a front end of a seat cushion;
   a footrest which is mounted on the leg rest in such a manner that it can be extended and retracted;
   a plurality of actuators which can adjust the angle of the leg rest and the position of the footrest; and
   a non-contact proximity sensor provided at the end of the footrest having a detecting section disposed to detect unexpected obstacles in the path of the end of the footrest when the leg rest or footrest are moved and send an output signal when unexpected objects are detected within a predetermined proximity of the detecting section; and
   a controller that receives the output signal and commands the footrest to retract when the proximity sensor detects that the footrest is within a distance $\delta$ of unexpected obstacles during the operation of the leg rest or the footrest.

9. The footrest unit for a passenger seat according to claim 8, wherein, when the proximity sensor detects that the footrest is approaching the unexpected obstacles, backward rotation of the leg rest is stopped.

10. The footrest unit for a passenger seat according to claim 8, wherein the leg rest can be rotated between an almost horizontal position and a housed position directed almost vertically downward.

11. The footrest unit for a passenger seat according to claim 8, wherein the proximity sensor is one of an optical proximity sensor and a sonic proximity sensor.

* * * * *